July 1, 1969 J. J. O'BRIEN 3,452,637

FASTENER AND ATTACHMENT THEREFOR

Filed Nov. 24, 1967

INVENTOR:
JOHN J. O'BRIEN

BY H. Samuel Kieser
ATTORNEY

United States Patent Office 3,452,637

Patented July 1, 1969

3,452,637

FASTENER AND ATTACHMENT THEREFOR

John J. O'Brien, Hamden, Conn., assignor to Olin Mathieson Chemical Corporation, a corporation of Virginia Filed Nov. 24, 1967, Ser. No. 685,349
Int. Cl. F16b *15/00, 13/04*
U.S. Cl. 85—10 9 Claims

ABSTRACT OF THE DISCLOSURE

A fastener assembly including the combination of a fastener member and an attachment. The attachment includes a tubular body portion having a flange at the forward end thereof adjacent the tip of the fastener. A plurality of fingers extend outwardly from the tubular portion of the attachment to enable the fastener assembly to be frictionally retained within the muzzle portion of a tool.

This invention relates generally to fasteners for power actuated tools. More particularly, this invention relates to a fastener assembly including a fastener and an attachment especially adapted for use in power actuated tools of the type utilizing a piston to drive the fastener into a work surface.

At the present time, there is on the market a fastener assembly including a fastener member provided with a special attachment which provides unique advantages when it is used in connection with piston type power actuated tools. These fastener assemblies generally include a fastener having a shank portion with a head at one end and a tapered tip at the forward end. The attachment is usually constructed in one piece from metallic material and includes a tubular body portion frictionally engaging the shank portion of the fastener with a flange at the forward end of the body portion positioned adjacent the forward end of the tip of the fastener.

Although the flange of the attachment of the above mentioned type fastener assembly is usually of greater diameter than the head of the fastener, the flange is positioned adjacent the forward end of the tip of the fastener. Thus, the muzzle end of the tool only needs a counterbore of a depth equal to the thickness of the flange. This construction results in the piston of the tool being fully supported during the entire fastening operation. Moreover, since the diameter of the flange of the fastener is greater than the diameter of the head, and because there is a friction fit between the fastener and attachment, a large area is brought to bear on the work surface during the fastening operation to help reduce spalling. In addition, the large flange in combination with the tubular body of the attachment tends to guide the fastener during the fastening operation preventing bending of the fastener.

However, up until the present invention, the muzzle end of the tools had to include some means for holding the fastener in place so that the fastener and attachment would not fall out under the influence of gravity when the muzzle bushing is pointed toward the ground. Such means have taken the form of detents positioned in the counterbore in the muzzle portion of the tool, magnetic means to magnetically hold the fastener assembly in the tool, and even the provision of a chamfer in the counterbore whereby when the fastener is forced into the muzzle end of the tool, the flange frictionally engages the chamfered portion. In the majority of these cases, the fastener holding means have either been ineffective or have added a great deal of expense to the manufacturing costs of the tool.

Accordingly, it is an object of the present invention to provide a fastener assembly including a fastener and an attachment that will be retained within the bore of the muzzle portion of the tool without the need of modification to the tool.

More specifically, it is an object of this invention to provide a fastener assembly including a fastener and attachment so designed that it will be frictionally retained in the bore of the muzzle portion of a fastening tool.

A further object of this invention is to provide an improved fastener assembly especially adapted for use in power actuated tools of the piston type.

These and other objects of the invention may be accomplished in accordance with the preferred embodiment of this invention through the provision of a fastener assembly including a combined fastener and attachment wherein the fastener includes a shank having a tapered tip at the forward end and a head at the rearward end. The attachment includes a tubular body portion frictionally retained on the shank and having a flange portion at its forwardmost end. The forward face of the flange is substantially planar and positioned adjacent the forward end of the tip of the fastener. A plurality of finger-like projections are lanced from the attachment with the rearward ends thereof attached to the tubular body portion. The fingers project radially outwardly beyond the periphery of the head of the fastener so that when the fastener is inserted into the bore of the tool having a diameter substantially equal to the head of a fastener, the fingers will engage the wall of the bore and be pressed inwardly thereby, so they will be in frictional engagement therewith and hold the fastener assembly in the tool.

A more complete understanding of these and other features of the invention will be gained from the consideration of the following description of the preferred embodiment of the invention illustrated in the accompanying drawing in which.

Figure 1:
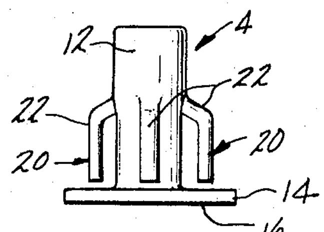
FIGURE 1 is a side elevation view of the attachment constructed in accordance with the present invention.
Figure 2:
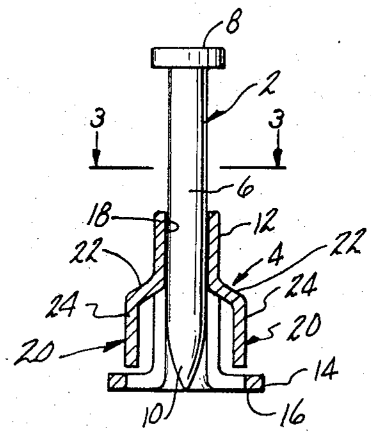
FIGURE 2 is a side view, partly in cross section, showing the fastener assembly of the present invention including a fastener having the attachment of FIGURE 1 secured thereto.

Referring now to the drawing, the fastener assembly of the present invention includes a fastener, indicated generally by 2, equipped with a fastener attachment 4. The fastener 2 may be of the general type including a cylindrical shank 6 having a head 8 at the rearward end of the shank 6 and a tapered tip 10 at the forward end thereof.

The fastener attachment 4 includes a generally tubular body 12 and a generally circular flange portion 14 at the forward end of the body 12. The tubular body 12 is positioned about the shank portion 6 of the fastener 2 and overlaps the tip portion 10 such that the planar forward face 16 of the flange portion 14 is positioned adjacent the forward end of the tip 10 of the fastener 2. Preferably, the forward face 16 is substantially flush with the end of the tip 10. The forward planar surface 16 of the flange 14 is generally perpendicular to the axis of the shank 6 of the fastener 2.

In accordance with the preferred embodiment of this invention, the outside diameter of the tubular body 12 of the attachment 4 is smaller than the diameter of the head portion 8 of the fastener 2. On the other hand, the outside diameter of the flange portion 14 is greater than the diameter of the head portion 8.

The inside surface 18 of the attachment 4 corresponds in shape to the shank portion 6 of the fastener 2. The attachment 4 engages the shank portion of the fastener 2 with a tight fit so that some force is required to move the fastener 2 relative to the attachment 4. This may be accomplished either by controlling the inside dimension of the tubular body portion 12 of the fastener with respect to the diameter of the shank portion 6 of the fastener 2 so that a friction fit is provided therebetween, or by crimping the rearward end of the attachment 4 to a diameter sufficient to establish a friction fit with the shank 6 of the fastener 2.

Figure 3:
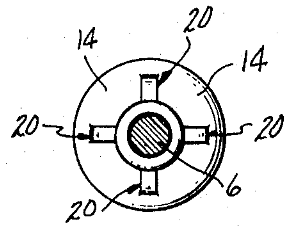
FIGURE 3 is a transverse sectional view taken along the lines 3—3 of FIGURE 2.

The attachment 4 is provided with a plurality of outwardly extending fingers 20. In the preferred embodiment, as shown in FIGURE 3, there are four such fingers. These fingers 20 are conveniently formed by lancing a portion of the flange and tubular body radially outwardly by means of a suitable punch when the attachment is held in a suitable die.

The preferred configuration of each finger is such that it includes an outwardly and forwardly tapering portion 22 having its rearward end connected to the tubular body 12 and a forwardly extending portion 24 having its rearward end integral with the tapering portion 22 and its forward end free. The forwardly extending portion 24 extends generally parallel to the axis of the fastener 2 with the free end spaced rearwardly from the flange 14. Each of the fingers 20 is so constructed that it extends radially outwardly beyond the periphery of the head 8 of the fastener 2, but not beyond the flange 14.

The attachment 4 is preferably fabricated from a metallic material and in the preferred embodiment of the invention, it is fabricated from aluminum. Aluminum has been found to provide the necessary qualities insofar as the spall reducing and fastener guiding requirements of the fastener are concerned and also has been found to be a material suitable for the required lancing operation to provide the fingers 20.

Figure 4:
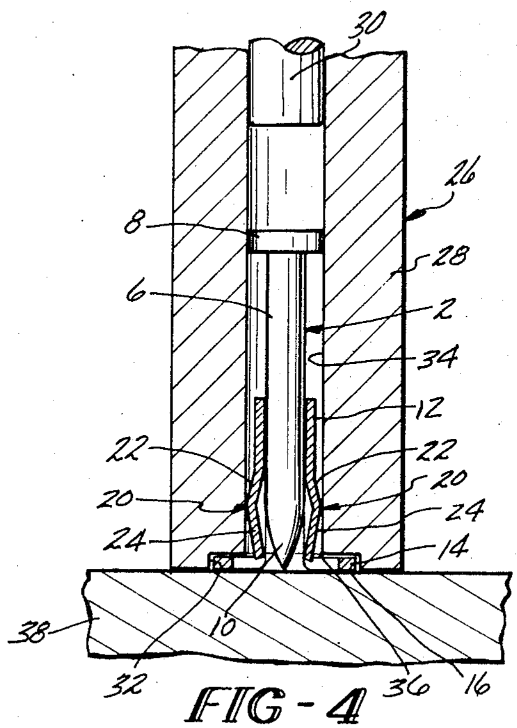
FIGURE 4 is a partial cross sectional view showing the fastener assembly of FIGURE 2 positioned in the muzzle end of a power actuated tool of the piston type.

Referring now to FIGURE 4, the power actuated tool indicated generally by 26, is shown with the fastener assembly 2 mounted therein. Only the muzzle portion 28 and the forward end of the piston member 30 are shown. The forward end of the muzzle portion 28 of the power tool 26 is provided with an enlarged counterbore 32 having a diameter slightly greater than the diameter of the flange 14 of the attachment 4 as well as having a depth slightly greater than the thickness of the flange 14.

As the fastener assembly is inserted into the bore 34 of the tool 26, the inner edge 36 of the base of the counterbore 32 engages the tapered portion 22 of each of the fingers 20 of the attachment 4 causing the fingers 20 to flex inwardly to the point where the fingers 20 can engage the wall of the bore 34. Due to the inherent resiliency of each of the fingers 20, they are biased outwardly against the wall of the bore 34, thereby frictionally engaging the bore to hold the fastener assembly in place. The tool can then be tilted with the muzzle end down without fear of the fastener assembly falling out. The tool can then be positioned against a work surface 38 and the tool actuated so that the piston 30 drives the fastener 2 into the work surface 38.

By virtue of the above-described construction there is provided a fastener assembly including a fastener and an attachment which can be frictionally retained within the muzzle portion of a tool without the need of any special modification of the tool. In addition, the particular configuration of the fingers 20 of the attachment 4 lends itself to easy insertion within the tool. The tapered portion 22 of the fingers 20 act as a cam surface whereby, as the fastener assembly is being inserted into the tool, the fingers 20 are urged inwardly so they can enter the bore 34 and frictionally engage the wall.

Although reference has been made above to a preferred embodiment of this invention, it will be readily appreciated that various modifications and alterations will readily suggest themselves to those skilled in the art.

What is claimed is:

1. In combination, a fastener including a shank, a tapered tip portion at the forward end of said shank, and a head portion at the rearward end of said shank; and a unitary, one-piece attachment having a tubular body portion and a flange portion at the forward end of said tubular body, said attachment being mounted on said shank with a friction fit, said flange portion having a forward planar surface extending substantially perpendicular to the axis of said shank and positioned adjacent the forward end of said tip portion, and a plurality of fingers extending outwardly from said tubular portion, each of said fingers including a first portion tapering outwardly and forwardly toward said flange portion, the rearward end of said first portion being attached to and integral with said body portion, and a second portion extending generally forwardly of said first portion with the rearward end thereof attached to and integral with said first portion and the forward end thereof being free and spaced rearwardly from said flange portion, said first portion extending to a point spaced outwardly from the axis of said fastener a distance greater than the distance from the axis of said shank to the outer periphery of said head portion.

2. The combination of claim 1 wherein said attachment is metallic.

3. The combination of claim 1 wherein the internal surface of said tubular body portion conforms to the shape of the shank of the fastener.

4. The combination of claim 3 wherein said head portion and said tubular body are generally cylindrical, the diameter of said head portion is greater than the outside diameter of said tubular body portion and is less than the diameter of said flange portion, and the outside diameter of said flange portion is such that its periphery is positioned radially outside of the outermost portions of each of said fingers.

5. The combination of claim 4 wherein said attachment is metallic.

6. In combination, a fastener including a shank, a tapered tip portion at the forward end of said shank and a head portion at the rearward end thereof; and an attachment having a tubular body portion and a flange portion at the forward end of said tubular body portion, said attachment being mounted on said shank with the flange portion thereof being positioned adjacent said tip portion, said attachment including at least one finger extending outwardly and forwardly from said body portion, said finger having a first portion tapering outward and forwardly toward said flange portion, the rearward end of said first portion being attached to and integral with said body portion, and a second portion extending generally forwardly of said first portion and having its rearward end attached to and integral with said first portion and the forward end thereof free and spaced rearwardly from said flange portion, said first portion being spaced outwardly from the axis of said fastener a distance greater than the distance from the axis of said fastener to the outer periphery of said head portion.

7. The combination of claim 6 wherein said attachment is metallic.

8. The combination of claim 6 wherein the internal surface of said tubular body portion conforms to the shape of said shank.

9. In combination, a fastener including a shank, a tapered tip portion at the forward end of said shank, and a head portion at the rearward end of said shank; and a one-piece, unitary attachment having a tubular body portion and a flange portion at the forward end thereof, said attachment being mounted on said shank with a friction fit, said flange portion being cylindrical and having a forward surface lying in a plane substantially perpendicular to the axis of said fastener and positioned adjacent said tip portion, a plurality of fingers extending outwardly from said tubular body and being spaced symmetrically about said tubular body portion, each of said fingers being lanced from both said tubular body and said flange and including a first portion tapering outwardly and forwardly toward said flange portion, the rearward end of said first portion being attached to and integral with said body portion, and a second portion extending forwardly from said first portion with the rearward end thereof being attached to and integral with said end portion and the forward end thereof being free and spaced rearwardly from said flange portion, said first portion being spaced outwardly from the axis of said shank a distance greater than the distance from the axis of said shank to the outer periphery of said head portion, said tubular body and said flange having said void portions corresponding to the portions of the fingers that were lanced therefrom.

References Cited

UNITED STATES PATENTS

| | | | |
|---|---|---|---|
| 2,255,650 | 9/1941 | Burke | 85—83 |
| 2,968,984 | 1/1961 | De Caro | 85—10 |
| 3,137,195 | 6/1964 | Rosenberg | 85—10 |
| 3,139,768 | 7/1964 | Biesecker | 151—41.75 |
| 3,212,388 | 10/1965 | Rosselet | 85—10 |
| 3,241,428 | 3/1966 | Fischer | 85—83 |
| 3,289,522 | 12/1966 | Bell | 85—10 |

FOREIGN PATENTS

| | | |
|---|---|---|
| 1,332,253 | 6/1963 | France. |
| 1,099,807 | 2/1961 | Germany. |
| 90,348 | 3/1959 | Netherlands. |

MARION PARSONS, Jr., *Primary Examiner.*

U.S. Cl. X.R.

85—80